(12) United States Patent
Buttolo et al.

(10) Patent No.: US 11,023,049 B2
(45) Date of Patent: Jun. 1, 2021

(54) METHODS AND SYSTEMS FOR ENABLING GESTURE CONTROL FOR A VEHICLE FEATURE

(71) Applicant: Ford Global Technologies, LLC, Dearborn, MI (US)

(72) Inventors: Pietro Buttolo, Dearborn Heights, MI (US); Stephen Ronald Tokish, Sylvania, OH (US); James Stewart Rankin, II, Novi, MI (US); Yifan Chen, Ann Arbor, MI (US); Gary Steven Strumolo, Canton, MI (US); Stuart C. Salter, White Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 324 days.

(21) Appl. No.: 14/950,812

(22) Filed: Nov. 24, 2015

(65) Prior Publication Data

US 2017/0147074 A1 May 25, 2017

(51) Int. Cl.
*G06F 3/01* (2006.01)
*B60N 2/02* (2006.01)
*B60Q 3/20* (2017.01)

(52) U.S. Cl.
CPC ............ *G06F 3/017* (2013.01); *B60N 2/02* (2013.01); *B60N 2/0224* (2013.01); *B60N 2/0228* (2013.01); *B60N 2/0244* (2013.01); *B60Q 3/20* (2017.02)

(58) Field of Classification Search
CPC ....... G06F 3/017; B60H 1/00642; B60N 2/02; B60Q 3/02; B60Q 40/08; B60R 25/2009
See application file for complete search history.

(56) References Cited

U.S. PATENT DOCUMENTS

| 8,823,517 | B2 | 9/2014 | Hadsall, Sr. | |
|---|---|---|---|---|
| 2002/0197955 | A1* | 12/2002 | Witkowski | G07C 5/008 455/41.1 |
| 2010/0063670 | A1* | 3/2010 | Brzezinski | H04L 67/1095 701/31.4 |

(Continued)

FOREIGN PATENT DOCUMENTS

| CN | 101573876 A | 11/2009 |
|---|---|---|
| CN | 101780787 A | 7/2010 |

(Continued)

OTHER PUBLICATIONS

Rogers, C., "Car Dashboard Controls Just a Hand Gesture Away", http://www.wsj.com/articles/car-dashboard-controls-just-a-hand-gesture-away-1420727845, Jan. 8, 2015, 4 pgs., The Wall Street Journal Webpage.

*Primary Examiner* — Fred Tzeng
(74) *Attorney, Agent, or Firm* — Michael Spenner; Brooks Kushman P.C.

(57) ABSTRACT

A vehicle gesture system includes a processor connected to a transceiver and programmed to detect a wireless device associated with a vehicle feature settings interface for a first vehicle feature. The processor is further programmed to detect the wireless device based on received user input at the vehicle feature settings interface of the first vehicle feature. The processor is further programmed to control a setting for the first vehicle feature based on received data associated with one or more gestures made using the wireless device.

17 Claims, 6 Drawing Sheets

(56) References Cited

U.S. PATENT DOCUMENTS

| | | | |
|---|---|---|---|
| 2011/0228098 A1* | 9/2011 | Lamb | G01S 17/023 348/164 |
| 2012/0259652 A1* | 10/2012 | Mallon | G06F 19/3418 705/2 |
| 2012/0313768 A1* | 12/2012 | Campbell | B60R 25/2009 340/438 |
| 2013/0066518 A1* | 3/2013 | Chen | G08C 17/02 701/36 |
| 2013/0138714 A1* | 5/2013 | Ricci | G06F 9/54 709/201 |
| 2013/0200991 A1* | 8/2013 | Ricci | G08C 19/00 340/4.3 |
| 2013/0211623 A1* | 8/2013 | Thompson | G07C 5/008 701/2 |
| 2013/0261871 A1 | 10/2013 | Hobbs et al. | |
| 2014/0106734 A1* | 4/2014 | Lee | H04W 4/008 455/419 |
| 2014/0277935 A1 | 9/2014 | Daman et al. | |
| 2014/0306814 A1* | 10/2014 | Ricci | H04W 48/04 340/425.5 |
| 2014/0309813 A1* | 10/2014 | Ricci | G06F 16/583 701/2 |
| 2014/0309871 A1* | 10/2014 | Ricci | B60Q 1/00 701/36 |
| 2014/0310788 A1* | 10/2014 | Ricci | G06F 16/583 726/6 |
| 2014/0320434 A1 | 10/2014 | Pantel | |
| 2015/0019266 A1* | 1/2015 | Stempora | G06Q 40/08 705/4 |
| 2015/0088339 A1* | 3/2015 | Fisher | A61G 3/00 701/2 |
| 2015/0116103 A1* | 4/2015 | Yang | G08B 21/24 340/438 |
| 2015/0129192 A1* | 5/2015 | Boss | B60H 1/00771 165/202 |
| 2015/0137941 A1* | 5/2015 | Bauer | G07C 9/00007 340/5.61 |
| 2015/0149042 A1* | 5/2015 | Cooper | B60R 16/037 701/48 |
| 2015/0310765 A1* | 10/2015 | Wright | G09B 19/167 434/66 |
| 2015/0332532 A1* | 11/2015 | Lee | G07C 9/00563 340/5.72 |
| 2015/0362997 A1* | 12/2015 | Hatton | G06F 3/017 701/2 |
| 2015/0363988 A1* | 12/2015 | Van Wiemeersch | H04M 1/11 455/557 |
| 2016/0042767 A1* | 2/2016 | Araya | G11B 19/02 386/201 |
| 2016/0070527 A1* | 3/2016 | Ricci | G06F 3/165 715/716 |
| 2016/0086397 A1* | 3/2016 | Phillips | G07C 5/0808 701/32.4 |
| 2016/0098871 A1* | 4/2016 | Oz | G07C 9/00111 340/5.61 |
| 2016/0098876 A1* | 4/2016 | Oz | G07C 5/008 340/5.61 |
| 2016/0099927 A1* | 4/2016 | Oz | H04L 63/08 726/9 |
| 2016/0140824 A1* | 5/2016 | Doyle | G08B 21/22 340/449 |
| 2016/0167486 A1* | 6/2016 | Yang | B60S 1/08 701/49 |
| 2016/0191584 A1* | 6/2016 | Dickow | H04L 67/12 709/219 |
| 2016/0335817 A1* | 11/2016 | Hatton | G07C 5/008 |
| 2017/0001649 A1* | 1/2017 | Dickow | H04W 12/08 |
| 2017/0013033 A1* | 1/2017 | Dickow | H04L 65/4084 |
| 2017/0064617 A1* | 3/2017 | Buttolo | B60R 16/037 |
| 2017/0126834 A1* | 5/2017 | Fransen | H04L 67/303 |

FOREIGN PATENT DOCUMENTS

| | | |
|---|---|---|
| CN | 103869975 A | 6/2014 |
| CN | 104411530 A | 3/2015 |

\* cited by examiner

METHODS AND SYSTEMS FOR ENABLING GESTURE CONTROL FOR A VEHICLE FEATURE

TECHNICAL FIELD

The present disclosure generally relates to enabling gesture control for a vehicle feature at a mobile device.

BACKGROUND

A vehicle computing system is used to provide several features and functions including remote starting, keyless entry, hands-free calling, navigation information and music to an occupant while traveling to a destination. The vehicle computing system may provide settings to allow configuration of certain vehicle features and functions based on an occupant's preference. The settings may be manually configured once the occupant enters the vehicle. For example, the vehicle computing system may be configured to adjust climate control settings at the vehicle via a knob or button associated with the climate control settings. The climate control settings may be initiated using physically-actuated vehicle inputs manipulated by the vehicle occupant.

In some cases, the vehicle occupant may wish to perform a number of functions at once. For example, in addition to driving the vehicle, the vehicle occupant may wish to enter a navigation destination, change a climate control setting, or adjust the volume of music playing in the vehicle. Other vehicle features and function adjustments are possible as well.

SUMMARY

In at least one embodiment, a vehicle gesture system includes a processor connected to a transceiver and programmed to detect a wireless device associated with a vehicle feature settings interface for a first vehicle feature. The transceiver is associated with a vehicle feature setting interface and is configured to establish communication with the wireless device. The processor is further programmed to detect the wireless device based on received user input at the vehicle feature settings interface of the first vehicle feature. The processor is further programmed to control a setting for the first vehicle feature based on received data associated with one or more gestures made using the wireless device.

In at least one embodiment, a method uses a processor to adjust a vehicle feature based on a gesture motion performed at a wireless device in communication with the processor. The method includes receiving, via the processor, a request to control a vehicle feature via a gesture at the wireless device based on input received at a user interface associated with the vehicle feature. The method further includes searching for the mobile device based on the request to control the vehicle feature and enabling the wireless device to control the vehicle feature using the gesture if the wireless device is detected within a predefined distance of the user interface.

In at least one embodiment, a computer-program product embodied in a non-transitory computer readable medium having stored instructions for programming a processor comprises instructions for searching for a wireless device within a predefined distance from a user interface based on a selected vehicle feature at the user interface. The computer-program product includes further instructions for controlling the vehicle feature using one or more gestures at the wireless device based on the wireless device being within the predefined distance of the selected vehicle feature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (FLASH, random access memory (RAM), read only memory (ROM), electrically programmable read only memory (EPROM), electrically erasable programmable read only memory (EEPROM), or other suitable variants thereof, for example) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a vehicle computing system having a smart module framework that recognizes a nomadic device within a predefined zone of a vehicle. The vehicle computing system may enable gesture control using the recognized nomadic device for various vehicle systems based on which predefined zone the nomadic device is recognized in. The smart module framework may be configured to split the vehicle interior into separate occupancy zones (vehicle seating areas, for example). In one example, the smart module framework may use the strength of Bluetooth low energy (BLE) signals received from the nomadic device to estimate a location (predefined zone, for example) of the nomadic device within the vehicle. In response to the nomadic device location being near a vehicle feature setting and/or function setting, the smart module framework may enable the nomadic device to control the setting via gestures. The vehicle computing system may configure the smart module framework to receive a gesture command from the nomadic device using an accelerometer and/or gyroscope at the device.

For example, the smart module framework may recognize a vehicle passenger's nomadic device at a front passenger seat of the vehicle. The front passenger seat may be recognized as the predefined zone by the VCS. The vehicle passenger may reach for seat controls to interact with one or more adjustments (vehicle seat setting, for example) for the front passenger seat. In response to the recognized nomadic device and the activation of the seat controls, the smart module framework may enable the seat controls via a gesture at the nomadic device.

In one example, if the nomadic device is a wearable device, the seat control gestures may include a "shaky" motion of the vehicle passenger's hand indicating the desire to turn on a "massage" function of the seat controls. The intensity of the "shaking" gesture may be used to apply the appropriate amount of seat massage vibration. In another example, the wearable device gesture motions may include an up and down motion, and side motion used to adjust the position of the seat and seat back.

Figure 1:
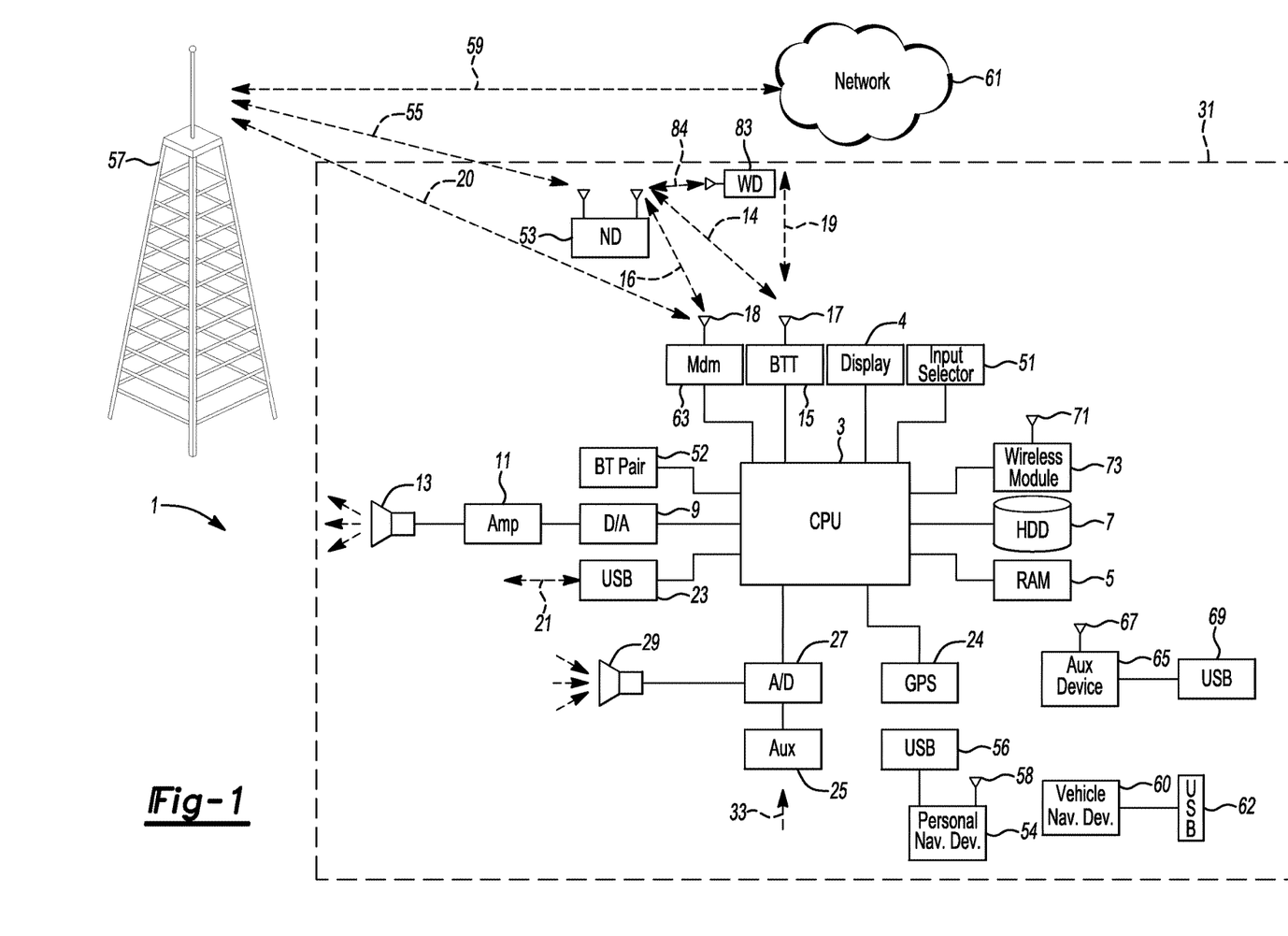
FIG. 1 is a representative topology of a vehicle computing system implementing a user-interactive vehicle information display system according to an embodiment.

FIG. 1 illustrates an example block topology for the VCS 1 for a vehicle 31. An example of such a VCS 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, or a spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor 3 is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS 1 may use a vehicle network (such as, but not limited to, a CAN bus) to pass data to and from the VCS 1 (or components thereof).

In one example, the number of different inputs may be associated with a setting for one or more vehicle features. In response to received input to adjust the setting associated with a vehicle feature, the processor 3 may communicate the adjusted setting to the vehicle feature via the vehicle network.

Outputs to the system may include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (cell phone, smartphone, tablet, PDA, or any other device having wireless remote network connectivity, for example). The nomadic device 53 may then be used to communicate 59 with a network 61 outside the vehicle 31 through, for example, communication 55 with a cellular tower 57. In some embodiments, tower 57 may be a WiFi access point. The nomadic device 53 may also be used to communicate 84 with an accessory device such as a wearable device 83 (smartwatch, smart glasses, etc., for example). The nomadic device 53 may communicate one or more control functions to the wearable device 83. For example, the nomadic device 53 may enable the wearable device 83 to accept a phone call, enable a mobile application, receive notifications, and/or a combination thereof. In another example, the wearable device 83 may transmit vehicle control features/functions to the VCS 1 based on one or more mobile applications executed at the nomadic device 53.

Communication between the nomadic device 53 and the BLUETOOTH transceiver 15 is represented by signal 14. Pairing a nomadic device 53 and the BLUETOOTH transceiver 15 can be instructed through a button 52 or similar input. Accordingly, the CPU 3 is instructed so that the onboard BLUETOOTH transceiver 15 may be paired with a BLUETOOTH transceiver in a nomadic device 53. In another example, the wearable device 83 and the BLUETOOTH transceiver 15 is represented by signal 14. Comparable to the nomadic device BLUETOOTH pairing process, pairing a wearable device 83 and the BLUETOOTH transceiver 15 can be instructed through a button 52 or similar input. The onboard BLUETOOTH transceiver 15 may be paired with a BLUETOOTH transceiver in a wearable device 83.

The processor 3 may be configured to transmit information to a previously paired nomadic and/or wearable device 53, 83 (a wireless device, for example). The processor may be configured to request communication with a previously paired wireless device. For example, in response to the requested communication from the processor, the previously paired wireless device may transmit an established communication message to the processor 3. The wireless device may include at least one of an accelerometer, gyroscope, and a combination thereof. The wireless device may transmit one or more commands to the processor 3 via the established communication based on gestures detected by the at least one of the accelerometer and gyroscope. The one or more commands sent by the wearable device to the processor 3 may include, but are not limited to, adjusting a setting for a vehicle feature, turning on a vehicle feature, and disabling a vehicle feature.

Data may be communicated between CPU 3 and network 61 utilizing, for example, a data-plan, data over voice, or DTMF tones associated with nomadic device 53. Alternatively, it may be desirable to include an onboard modem 63 having an antenna 18 in order to communicate 16 data between CPU 3 and network 61 over the voice band. The nomadic device 53 may then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor 3 is provided with an operating system including an application program interface (API) to communicate with modem application software. The modem application software may access an embedded module or firmware on the BLUETOOTH transceiver to complete wireless communication with a remote BLUETOOTH transceiver (such as that found in a nomadic device 53 and/or wearable device 83). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device 53, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. In another example, the wireless device (nomadic device 53, wearable device 83, etc., for example) may communicate with the processor via USB connection. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices can be connected through a wireless 67 or wired 69 connections. Auxiliary device 65 may include, but are not limited to, personal media players, wireless health devices, portable computers, and the like.

Also, or alternatively, the CPU 3 could be connected to a vehicle based wireless router 73, using for example a WiFi (IEEE 803.11) 71 transceiver. This could allow the CPU 3 to connect to remote networks in range of the local router 73.

In addition to having representative processes executed by a VCS 1 located in a vehicle, in certain embodiments, the processes may be executed by a computing system in communication with a vehicle computing system. Such a system may include, but is not limited to, a wireless device (a mobile phone, a smartphone, the nomadic device 53, wearable device 83 etc., for example) or a remote computing system (a server 61, for example) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) 1 located within the vehicle itself is capable of performing the processes.

Figure 2:
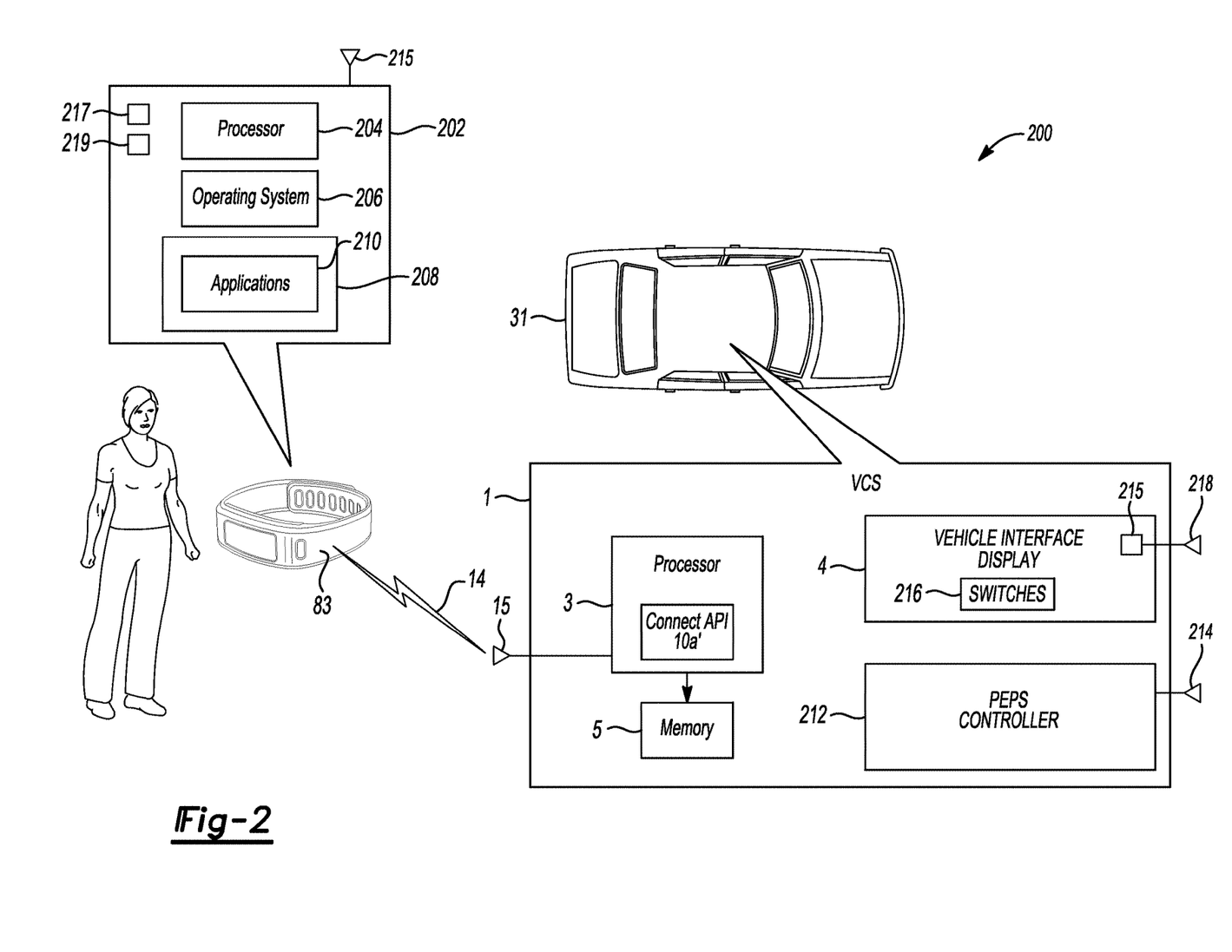
FIG. 2 is an exemplary block topology of a system for integrating a wearable device with the vehicle based computing system according to an embodiment.

FIG. 2 is an exemplary block topology of a system for integrating the wearable device 83 with the VCS 1 according to an embodiment. A nomadic device 53 may also include the hardware of the wearable device 83 and perform the functions and tasks as the wearable device 83 disclosed in the embodiment illustrated in FIG. 2. The wearable device 83 may include a system 202 comprising at least one processor 204, an operating system 206, a transceiver 215, and memory 208 to store one or more applications 210. The wearable device 83 may execute the one or more applications 210 with hardware of the system 202. The wearable device 83 may also include user interface hardware including a display, motion detectors (accelerometer 217, gyroscope 219, etc., for example), and/or an input mechanism.

The wearable device 83 may wirelessly communicate one or more control commands to the vehicle 31. The one or more control commands may be based on the movement of the wearable device 83. For example, in response to a user touching a door handle to wake up the processor 3 from a shutdown mode, the VCS 1 may search for a previously paired wireless device (the wearable device 83, for example). In response to VCS 1 recognizing the wearable device 83 at the door handle, the wearable device 83 may transmit a command to the VCS 1 to unlock a vehicle door based on the wearable device being moved in a predefined gesture. In one example, the predefined gesture for unlocking a vehicle door may include, but is not limited to, a circular motion. The vehicle 31 may include the VCS 1 comprising the processor 3, memory 5, the interface system (touchscreen display 4, for example), the transceiver 15 (Bluetooth wireless transceiver, for example), and a passive entry passive start (PEPS) controller 212.

The PEPS 212 controller may include a wireless transceiver 214 configured to communicate with a previously paired wireless device. Continuing from the example above, in response to a user touching a door handle, the PEP 212 controller may wakeup from a powerdown mode and search for a previously paired wireless device. The PEPS 212 controller may recognize the wearable device 83 as the previously paired wireless device. In response to the wearable device 83 recognized as the previously paired wireless device, the wearable device 83 may transmit one or more commands via gesture motions to the PEPS controller 212. The one or more commands may include, but is not limited to, keyless access and start via gestures at the wearable device 83.

In another example, to gain access or entry into the vehicle with the wearable device 83, a user may have to wake up the PEPS controller 212 to establish bi-directional communication between the wearable device 83 and the PEPS controller 212. Such a wake up may occur by requiring the user to touch and/or pull the door handle of the vehicle 31. In response to the door handle being toggled or touched, the PEPS controller 212 may wake up and transmit a wireless signal to the wearable device 83. The PEPS controller 212 and the wearable device 83 may undergo a series of communications back and forth to each other (handshaking, for example) for vehicle access authentication purposes. The PEPS controller 212 may unlock the doors in response to a successful completion of the handshaking process and the wearable device 83 being maneuvered in a predefined gesture. Once the user is in the vehicle 31, the user may simply perform another maneuver of a predefined gesture via the wearable device 83 to start the vehicle.

The vehicle interface display 4 may be implemented as a message center on an instrument cluster or as a touch screen monitor and is generally configured to present text, menu options, status or other such inquiries to an occupant in a visual format. The vehicle interface display 4 may include a display processor 215, a screen, at least one control switch 216, and a transceiver 218. The occupant may scroll through the various fields of text and select menu options via the control switch 216. The control switch 216 may be remotely positioned from the interface display or positioned directly on the interface display. The control switch 216 may include, but is not limited to, a hard button, soft button, touchscreen, and/or voice command. In response to user input at the control switch 216, the display processor 215 may be programmed to search for a previously paired wireless device via the display transceiver 218.

For example, the display processor 215 may enable communication with the wearable device 83 closest to the control switch 216. The display processor may calculate the wearable device 83 closest to the control switch 216 based on signal strength of one or more wireless devices detected within a vehicle cabin via the display transceiver 218. The display processor 215 may enable the wearable device 83 to scroll through the various fields of text and select menu options at the interface display 4 via device gestures. More specifically, the wearable device 83 may scroll through various field of text at the interface device 4 based on the device 83 being moved in a predefined gesture. The predefined gesture to scroll through the various fields of text may include, but is not limited to, a circular motion, a swipe motion, a movement along a horizontal axis, a movement along a vertical axis, and/or a combination thereof.

The vehicle interface display 4 may be any such device that is generally situated to provide information and receive feedback to/from a vehicle occupant. The interface display 4, the PEPS controller 212, the processor 3, and the other components in communication with the VCS 1 may communicate with each other via a multiplexed data link communication bus (CAN Bus, for example).

In one example, the VCS 1 may include one or more processors 3 for body electronic controls of an interior section of the vehicle 31. The one or more processors 3 may include a plurality of fuses, relays, and various microcontrollers for performing any number of functions related to the operation of interior and/or exterior electrically based vehicle functionality. Such function may include, but are not limited to, electronic unlocking/locking (via interior door lock/unlock switches), remote keyless entry operation, vehicle lighting (interior and/or exterior), electronic power windows, and/or ignition switch status (Off, Run, Start, Accessory, for example). The one or more processors 3 may each have their own transceiver configured to communicate with a wireless device.

For example, a seat module may include a processor, a transceiver, and one more applications stored in memory. The one or more applications may include seat settings and functions that may be controlled via a vehicle feature settings interface. In response to a vehicle occupant selecting the vehicle feature settings interface associated with the seat settings and functions, the seat module may begin searching for the wireless device associated with the vehicle feature settings interface. The seat module may recognize the wearable device 83 and allow control of the seat settings and functions based on the gestures being maneuvered at the wearable device 83. In one example, the seat control gestures at the wearable device 83 may include, but is not limited to, an up and down motion (movement in the vertical axis, for example) to control a chair tilt position setting of the seat. In another example, the seat control gestures at the wearable device 83 may include a side-to-side shaking motion to control the setting associated with a massage vibration function of the seat.

The wirelessly broadcasted signal 14 may be generated by the wireless transceiver 15. The wirelessly broadcast signal 14 may notify the presence of the VCS 1 to the wearable device 83. For example, the wireless transceiver 15 may include, but is not limited to, a BLE broadcast. The wireless transceiver generating the BLE signal may include, but is not limited to, a low-powered wireless transceiver 15.

The wearable device 83 may execute a gesture application associated with one or more vehicle settings based on the received BLE broadcast. For example, the gesture application at the wearable device 83 may provide a predefined amount of gesture motions for the one or more vehicle settings. The predefined amount of gesture motions may be used for adjusting the one or more vehicle settings. More specifically, a same gesture may be used to control a setting associated with several vehicle features. The gesture application may receive a feature identification from a vehicle control module (the processor 3, for example) to determine what setting adjustment message to send based on the detected gesture via the accelerometer and/or gyroscope of the device.

The gesture application may provide a predefined amount of gesture motions that may be applicable to vehicle settings associated with several vehicle features. For example, the wearable device 83 may establish communication with the seat module. In response to the established communication with the seat module, the wearable device 83 may associate one or more gesture motions with seat settings. In another example, the wearable device 83 may establish communication with a climate control module. In response to the established communication with the climate control module, the same gesture motions used for the seat settings may now be configured to be associated with the climate control settings. Therefore, the one or more gesture motions detected at the wearable device 83 may control the climate control settings. The gesture application provides a predefined set of gestures to be used for several vehicle features based on a detection of a specific vehicle module requesting communication with the wireless device.

Figure 3:
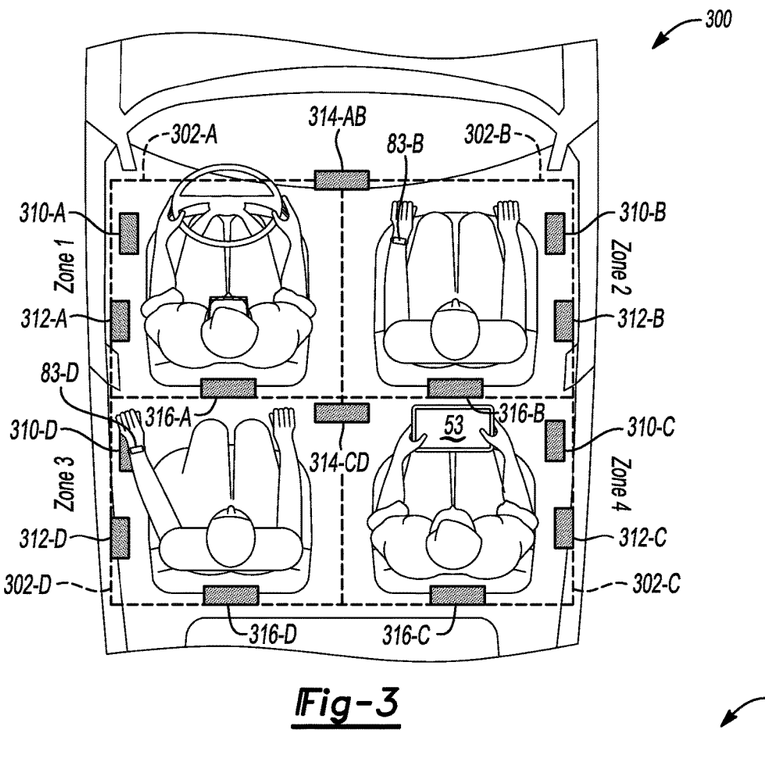
FIG. 3 is a representative topology of the vehicle based computing system having a smart module framework configured to recognize a wireless device within a vehicle zone.

FIG. 3 is a representative topology of the VCS 1 having a smart module framework 300 configured to recognize a wireless device (a wearable device 83, nomadic device 53, etc., for example) within a vehicle zone 302-A through 302-D (collectively 302). The smart module framework may be configured to split the vehicle interior into vehicle zones 302 with the use of one or more transceivers. The vehicle zones may include zone 1 302-A, zone 2 302-B, zone 3 302-D, and zone 4 302-C.

In one example, one or more modules in the smart module framework 300 may be associated with a transceiver. The transceiver may identify a wireless device using wireless positioning methods including, but not limited to, Radio Signal Strength (RSS). For example, the RSS BLUETOOTH positioning enables a mathematical model to analyze the relationship between RSS and the distance of one or more BLUETOOTH devices. For example, the smart module framework 300 may execute distance-based algorithms for wireless device location identification including, but not limited to, Least Square Estimation, Three-boarder, and Centroid Method. In response to the distance-based algorithms recognizing a wireless device, the smart module framework 300 may calculate which vehicle zone 302 the wireless device is located in.

The one or more modules in the smart module framework 300 may include a seat module, a climate control module, a lighting module, and a speaker module. The one or more modules may have at least one processor, a transceiver, and an application to control settings for a vehicle feature. For example, the seat module may have one or more seat controls 310-A through 310-D. The climate control module may have one or more climate controls 314-AB, 314-CD. The lighting module may have one or more lighting controls 312A-through 312-D. The speaker module may include one or more speaker units 316-A through 316-D.

The smart module framework 300 may detect a vehicle occupant requesting to interact with a control setting associated with a vehicle feature. In response to the detection, the smart module framework 300 may identify a device associated with the vehicle occupant. The smart module framework 300 may enable communication with an identified device associated with the vehicle occupant requesting interaction with the control setting.

For example, a vehicle occupant sitting in the rear-driver-side seat may select a seat setting via the seat control 310-D. The seat control 310-D may have the seat setting activated using a vehicle feature settings interface. The vehicle feature settings interface may include, but is not limited to, a switch, proximity sensor, mechanical button, and/or a combination thereof. In response to the detection of the physical interaction of the seat control 310-D, the smart module framework 300 may transmit a request to activate a gesture application at the identified device 83-D associated with the vehicle occupant requesting interaction with the seat control 310-D. In one example, the seat control module may transmit the interaction request via a seat control module transceiver to the wireless device associated with seat control 310-D. In another example, the VCS 1 may manage the interaction request messages using one or more transceivers to identify a wireless device in a vehicle zone 302 associated with the seat control 310-D.

Continuing from the example above, the identified device 83-D, as shown in FIG. 3 as a smartwatch 83-D, may execute the gesture application to adjust the control setting associated with a vehicle feature. In response to the vehicle occupant's interaction with the seat control 310-D, the gesture application may receive a message associated with the seat module via the smartwatch 83-D. The gesture application may configure the one or more gestures with the seat setting based on the message associated with the seat module.

In another example, a vehicle occupant sitting in the rear-passenger-side seat may select a light setting via the light control 312-C. The lighting module may detect the selection of the light setting via the light control 312-C and transmit an identification request for a device associated with the vehicle occupant sitting in the rear-passenger-side seat. In addition to communication with the light control 312-C, the lighting module may identify the nomadic device 53 associated with the vehicle occupant sitting in zone 4 302-C via a lighting module transceiver. In another example, the VCS 1 may receive the selection of the light setting and identify the nomadic device 53 via the one or more modules and transceivers in communication via the CAN Bus.

Continuing from the example, the identified nomadic device 53 may execute the gesture application for the light control 312-C. In response to the vehicle occupant's interaction with the lighting control 312-C, the gesture application being executed at the nomadic device 53 may receive a message associated with the lighting module. The gesture application may configure the one or more gestures with the light setting based on the message associated with the light module. The nomadic device 53 may receive signals from one or more movement sensors (accelerometer, for example) detecting a gesture using the device. The nomadic device may associate a light setting adjustment based on the received signals and transmit a message to adjust the light setting at the light control 312-C.

The VCS 1 executing the smart module framework may be configured to transmit an interaction request to a device associated with the vehicle passenger requesting adjustment of a vehicle feature setting. The VCS 1 may identify the wearable device 83-B located in zone 2 302-B. The VCS 1 may enable gesture control at the wearable device 83-B for the seat control 310-B, lighting control 312-B, climate control 314-AB, and speaker unit 316-B located in zone 2 312-B. For example, the VCS 1 may receive a message that the climate control 314-AB obtained a request to adjust a climate setting. The VCS 1 may recognize the wearable device 83-B located nearest to the climate control 314-AB. In response to the recognized wearable device 83-B, the VCS 1 may transmit a climate control message to the device 83-B to enable gesture control for one or more climate control settings via the gesture application. The wearable device 83-B may associate the one or more gestures with climate control settings based on the received climate control message. The wearable device 83-B may adjust the climate control 314-AB based on transmitted messages associated with the one or more gestures to the VCS 1.

Figure 4:
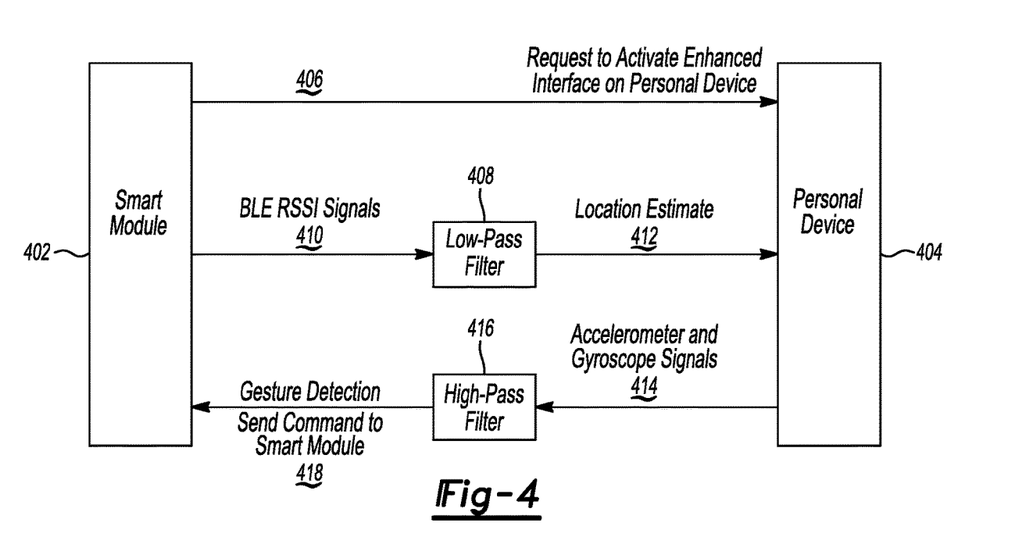
FIG. 4 is a representative topology of a smart module requesting adjustment of a feature setting from the wireless device within a predefined distance of a user interface associated with the smart module.

FIG. 4 is a representative topology of a smart module 402 requesting adjustment of a feature setting using a wireless device 404 within a predefined distance. The predefined distance may be a calibratable value to determine if the wireless device 404 is near a smart module user interface having the feature setting switch. The smart module may include, but is not limited to, the seat module, climate control module, lighting module, and speaker module.

In response to detection of physical interaction of the feature setting switch, the smart module 402 (processor 3, for example) may transmit a request to activate 406 an enhanced interface application (the gesture application, for example) on a device 404 (nomadic device 53, wearable device 83, etc., for example). The smart module 402 may identify the device 404 associated with the vehicle occupant requesting adjustment of a vehicle feature via the feature setting switch. The smart module may detect the device 404 associated with the vehicle occupant based on a positional lateration method. The positional lateration method may include, but is not limited to, RSS location estimation of the device 404.

For example, the smart module 402 may transmit a BLE RSS signal 410 to the personal device 404. The BLE RSS signal may be filtered through a low-pass filter 408 to remove noise from the signal, therefore improving the location estimation of the device 404. The smart module may transmit the filtered BLE RSS signal 412 to the device 404. In another example, the one or more devices in the vehicle may execute the positional lateration method based on the received request to activate the enhanced interface application via the smart module 402. The one or more devices may detect which device is closest to the vehicle occupant requesting adjustment of a vehicle feature via the feature setting switch.

The device 404 may receive the enhanced interface application request 406 and launch the application. The enhanced interface application request 406 may include a smart module ID used to identify which vehicle feature setting is associated with the one or more gestures. For example, the smart module ID may identify the smart module programmed to control a vehicle feature including, but not limited to, navigation settings, climate control settings, radio settings, lighting settings, and seat settings.

The device 404 may use one or more sensors (gyroscope, accelerometer, etc., for example) to detect gestures. The accelerometer and/or gyroscope signals may be transmitted 414 through a high-pass filter 416 to remove drift from the signals while improving the gesture detection. The device 404 may correlate the detected gesture with the appropriate command for the smart module based on the smart module ID. For example, in response to the smart module ID being a lighting module, an up and down gesture of the device 404 may be associated with a dim setting for a vehicle light. Continuing from the example, the device 404 may detect the down gesture of the device 404 and transmit a request to lower a dim setting for a light control via the lighting module.

Figure 5A:
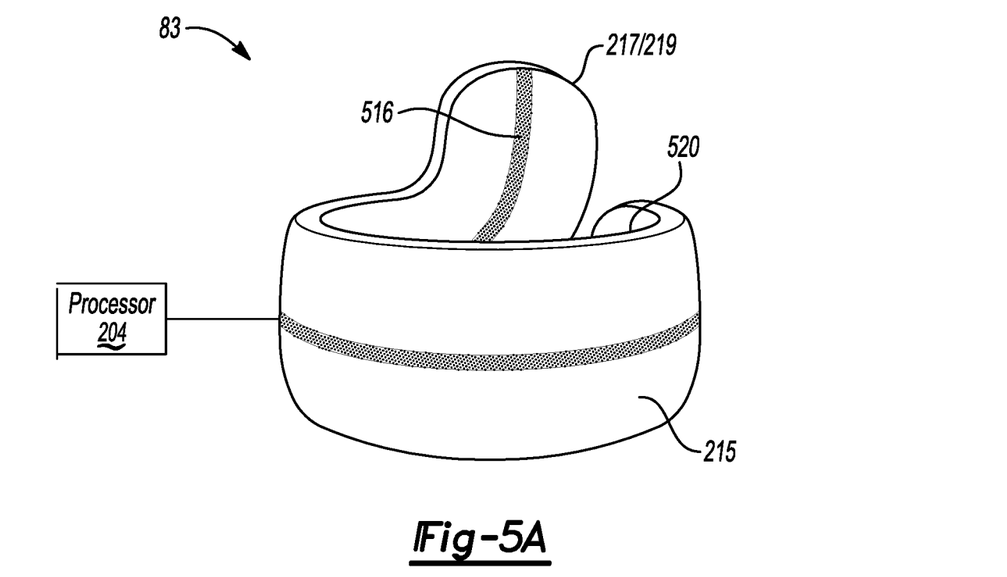
FIG. 5A-5B are an exemplary embodiment of the wearable device configured to communicate with the vehicle based computing system.
Figure 5B:
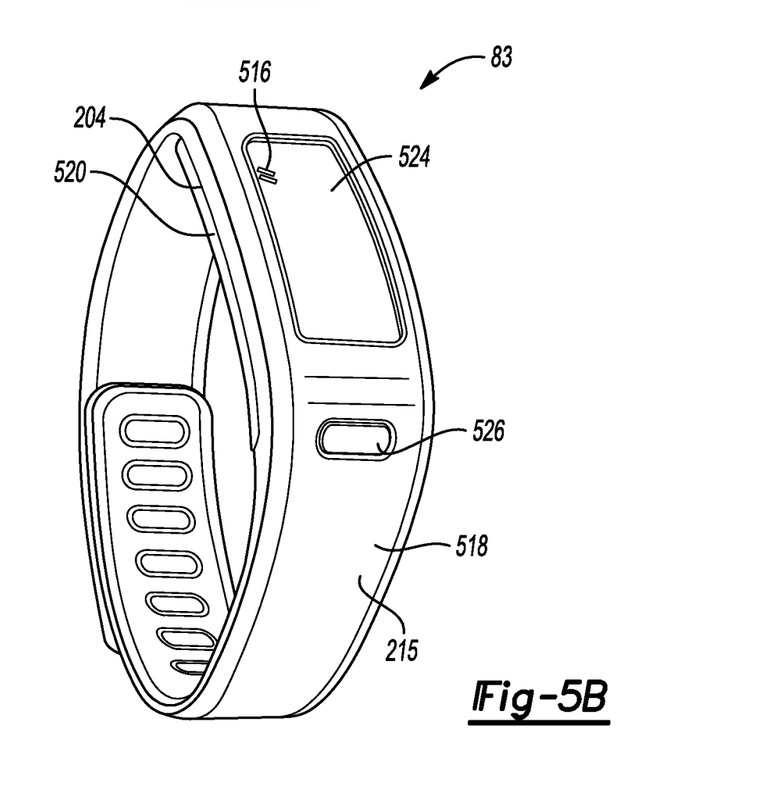

FIG. 5A-5B are an exemplary embodiment of the wearable device 83 configured to communicate with the VCS 1. FIG. 5A is an exemplary embodiment of the wearable device 83 configured as a ring. The ring configuration may include, but is not limited to, a system having a processor 204, an LED indicator 516, at least one sensor 217, 219, a battery 520, and/or a wireless transceiver 215 (Bluetooth transceiver, for example). The ring wearable device 83 may allow the user to control one or more vehicle settings based on a predefined movement of the device. The ring wearable device 83 may transmit one or more messages based on the predefined movement to the VCS 1 via the wireless transceiver 215.

For example, the ring wearable device 83 may be recognized by the smart module. In response to the enhanced interface application being executed at the ring wearable device 83, the device may transmit one or more commands to the smart module based on gesture detection via the at least one sensor 217, 219.

FIG. 5B is an exemplary embodiment of the wearable device 83 configured as a bracelet. The bracelet 83 configuration may include, but is not limited to, a system having a processor 204, an LED indicator 516, at least one sensor 217, 219, a battery 520, a wireless transceiver 215, a display 524, and/or a switch 526. The bracelet wearable device 83 may allow the user to control one or more vehicle settings based at least one of a predefined movement, the display 524, the switch 526, and a combination thereof. For example, the VCS 1 may transmit a wireless signal to the bracelet wearable device 83 notifying the device that the vehicle is present. The display 524 of the bracelet may output a message to a user asking if the user would like to unlock the door by using the switch 526 to initiate the transmission of the unlock request. If the user selects to unlock the vehicle, the user may either select the unlock command by hitting the switch 526 and/or perform a particular defined gesture of the bracelet (attached to the user's arm) to unlock the door.

In another example, the VCS 1 executing a smart module framework may calculate the bracelet wearable device 83 being within a predefined distance of a feature setting switch associated with a smart module. The bracelet wearable device 83 may receive a request to activate the gesture application based on user interaction with the feature setting switch. The bracelet wearable device 83 may transmit one or more commands to the smart module based on gesture detection via the at least one sensor 217, 219.

Figure 6:
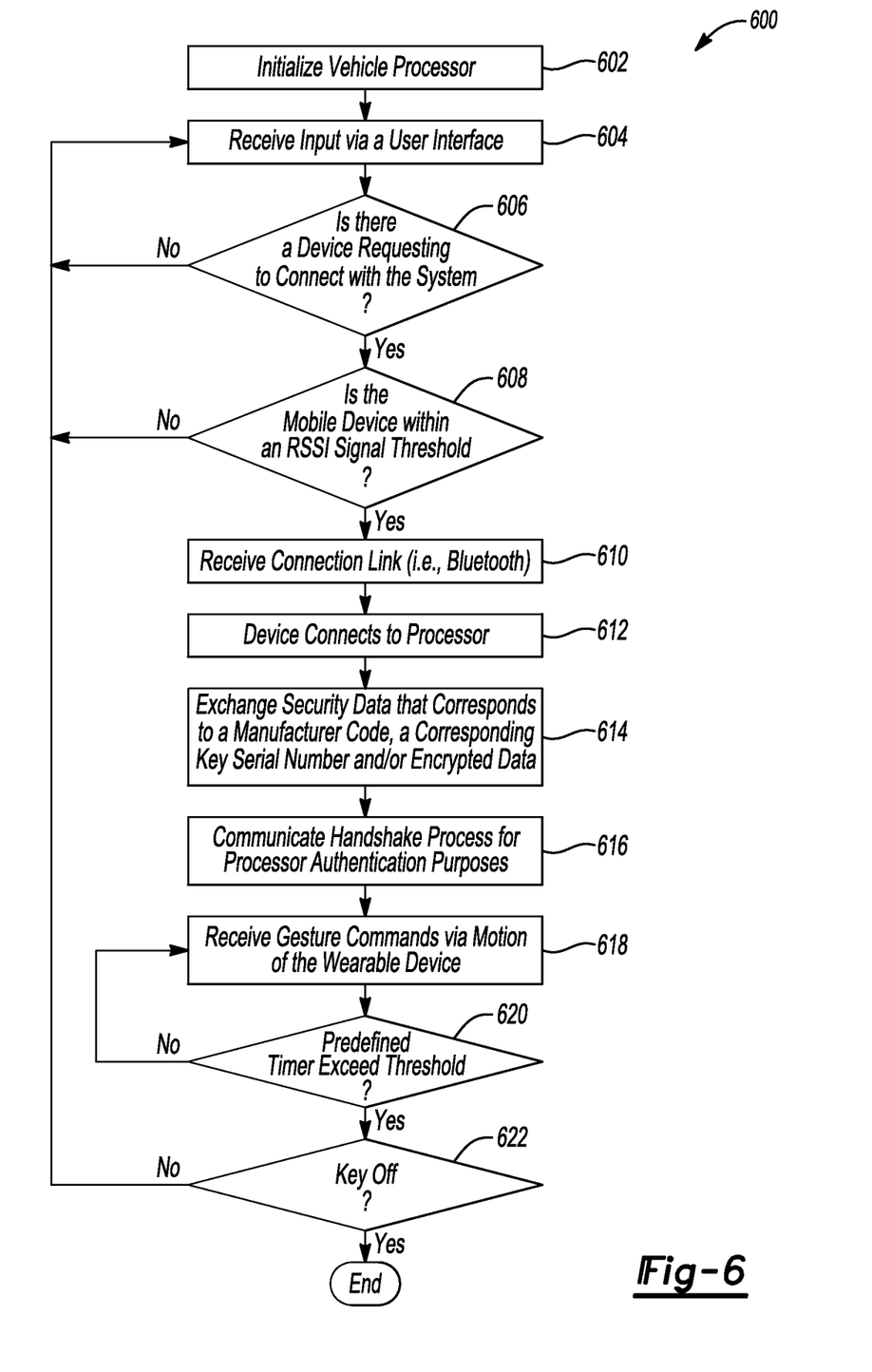
FIG. 6 is a flow chart illustrating an example method of the vehicle computing system communicating with the wireless device.

FIG. 6 is a flow chart illustrating an example method 600 of the VCS 1 in communication with a gesture application at the wearable device. The gesture application is executed on hardware at the device. The gesture application may include instructions to control one or more vehicle settings. The method 600 may be implemented using software code contained within the VCS 1. In other embodiments, the method 600 may be implemented in other vehicle controllers (one or more smart modules, for example), or distributed amongst multiple vehicle modules.

Referring again to FIG. 6, the vehicle and its components illustrated in FIG. 1 through FIG. 5 are referenced throughout the discussion of the method 600 to facilitate understanding of various aspects of the present disclosure. The method 600 of controlling a vehicle feature/function (vehicle settings, for example) using a wearable device via a communication link with the VCS 1 may be implemented through a computer algorithm, machine executable code, or software instructions programmed into a suitable programmable logic device(s) of the vehicle, such as the smart module, the device processor, another controller in communication with the vehicle computing system, or a combination thereof. Although the various operations shown in the flowchart diagram 600 appear to occur in a chronological sequence, at least some of the operations may occur in a different order, and some operations may be performed concurrently or not at all.

In operation 602, a user may initialize the VCS 1 by triggering a wake up request. The wake up request may include, but is not limited to, touching the door handle, pulling the door handle, activating a setting via a switch and/or activating a motion sensor near the vehicle. The VCS 1 may receive input via a user interface in operation 604. The received input may be associated with a vehicle setting configured to control and/or adjust a vehicle feature and/or function.

In operation 606, the VCS 1 may determine if there is a device requesting to connect with the system based on the received input. In response to detecting a device, the VCS 1 may calculate if the device is within an RSS signal threshold in operation 608. For example, the RSS signal threshold is used to determine if a located device is associated with a vehicle occupant providing input to the user interface. The RSSI signal threshold is based on a mathematical model to analyze the relationship between RSS and a predefined distance of one or more devices from the user interface.

In operation 610, the VCS 1 may receive a connection link with the device being within the predefined distance. The device connects to the processor associated with the vehicle setting. For example, in response to the received input via a user interface, the device connects to the processor associated with the received input. More specifically, if the received input was related to a speaker setting, the device may connect to the speaker module associated with the speaker setting.

The device and VCS 1 may be connected via a wireless communication. Once a communication connection is established, the device may exchange security data that corresponds to a smart module ID and/or encrypted data with the VCS in operation 614.

In one example, the VCS 1 may implement a security process to ensure that communication with the application at the device is acceptable for use in the vehicle. The VCS 1 may transmit a token to authenticate the device. The token ensures that the device may be acceptable to communicate with the VCS 1. In another example, a message protocol may be used to encode messages exchanged between the device and the VCS 1 to command and control authorized communication.

In operation 616, the application at the device and the VCS 1 are connected via the wireless communication (BLE, for example) after passing appropriate security handshakes and protocols. The VCS 1 may receive a vehicle setting command related to the received input at the user interface based on a motion of the device in operation 618. The VCS 1 may receive motion data from the device to adjust one or more vehicle settings associated with the connected processor. The motion data may include predefined hotkeys, a swipe, and/or a predefined gesture/movement.

In operation 620, the VCS 1 may enable an adjustment setting timer based on the movement of the device within a predefined time. The adjustment setting timer may prevent unwanted adjustment of vehicle settings if no input is received from the device within the predefined time. In response to an adjusted vehicle setting via the gesture detected at the device, the method may determine if a key off event is detected in operation 622. If no key off event is detected, the method may continue to monitor whether a device is requesting to connect with a system based on received input via a user interface in operation 604.

Figure 7:
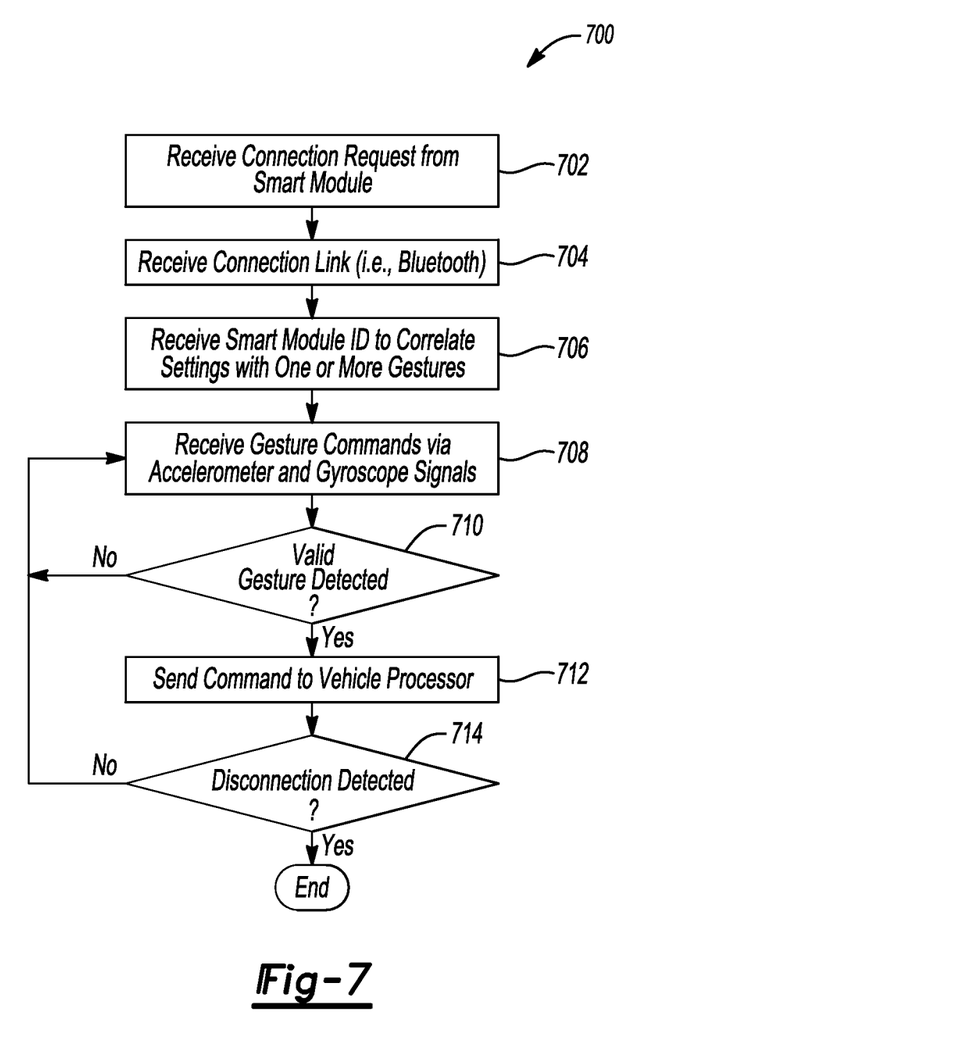
FIG. 7 is a flow chart illustrating an example method to configure one or more vehicle feature settings using gestures via the wireless device.

FIG. 7 is a flow chart illustrating an example method to configure one or more vehicle feature settings using gestures via the wireless device. The wireless device may transmit one or more commands to a smart module in communication with the VCS. The one or more commands to the smart module may control/adjust a vehicle feature/function. The wireless device may transmit the one or more commands based on a detected gesture. The gesture may include, but is not limited to, a predefined movement of the wireless device to transmit a particular command.

In operation 702, the wireless device may receive short range wireless communication from a smart module. The short range wireless communication may include, but is not limited to, BLE, Bluetooth, and/or NFC. The wireless device may go through a pairing process and/or pass through a number of security handshakes before communicating with the smart module.

In operation 704, the wireless device may establish a connection to the smart module. The smart module may receive a smart module ID to correlate the one or more gestures with settings associated with the smart module in operation 706.

The smart module may receive commands via motions of the wireless device in operation 708. For example, the wireless device may measure the motions using an accelerometer and/or gyroscope sensors. The motions of the wireless device may be preconfigured and associated with the settings for the smart module.

In operation 710, the wireless device may monitor commands received from the accelerometer and/or gyroscope to determine if the gesture is recognized and/or valid. The wireless device may send a command to the smart module based on a valid gesture detected by the device in operation 712.

In one example, the smart module may adjust one or more settings based on the received message from the wireless device. The smart module may transmit a message to the wireless device notifying that the module has adjusted the setting.

In operation 714, the wireless device may discontinue communication with the smart module based on several factors including, but not limited to, the location of the wireless device, notification that the setting has been adjusted at the smart module, and/or the smart module being requested to power-down.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle gesture system comprising:
   a first transceiver associated with a first vehicle feature settings interface controlling a first vehicle feature;
   a second transceiver associated with a second vehicle feature settings interface controlling a second vehicle feature; and
   a processor communicating with the first transceiver and second transceiver and programmed to:
   in response to user input received at the first vehicle feature settings interface, associate a wireless device with the first vehicle feature settings interface,
   in response to user input received at the second vehicle feature settings interface, associate the wireless device with the second vehicle feature settings interface, and
   determine which of the first or second vehicle features is to be controlled by the wireless device, based on proximity of the wireless device to each of the vehicle features settings interfaces;
   control a setting for the determined vehicle feature based on received data associated with predefined device motion patterns detected using an accelerometer of the wireless device.

2. The system of claim 1, wherein the determination of which feature to control is based on the wireless device being within a predefined distance of the first or second vehicle feature settings interface and wherein the processor is further programmed to determine proximity of the wireless device via a Bluetooth Low Energy vehicle antenna.

3. The system of claim 1, wherein the predefined device motion patterns are associated with a predefined setting for the determined vehicle feature.

4. The system of claim 3, wherein the first vehicle feature comprises a lighting system and wherein the processor is further programmed to control the lighting system in response to the received data being associated with predefined device motion pattern including moving the wireless device in an up and down motion.

5. The system of claim 1, wherein the same predefined motion pattern is associated with different feature control based on which of the first or second vehicle feature interfaces is with a predefined distance of the wireless device.

6. The system of claim 5, wherein the second vehicle feature comprises a climate system and wherein the processor is further programed to control the climate system in response to the received data being associated with the predefined device motion pattern including moving the mobile device in an up and down motion.

7. The system of claim 1, wherein the first and second vehicle features are different and are at least one of a climate system, a seat system, a navigation system, and a radio system.

8. The system of claim 1, wherein the first and second vehicle feature settings interfaces are each at least one of a user interface screen, knob, button, soft key button, and hard key button.

9. The system of claim 1, wherein the wireless device is at least one of a smartwatch, wearable wrist device, and wearable ring device.

10. A method comprising:
    receiving, via a processor, a request to control a vehicle feature using a wireless device based on input received at a user interface associated with the vehicle feature;
    searching for the wireless device based on the request to control the vehicle feature; and
    responsive to the wireless device determined to be within a predefined distance of the user interface, enabling the wireless device as a control for the vehicle feature using predefined device movement patterns performed with the wireless device by moving the wireless device in a given one of the predefined movement patterns.

11. The method of claim 10, further comprising, detecting a proximity of the wireless device based on a Bluetooth Low Energy vehicle antenna; and, if the proximity is within the predefined distance of the user interface associated with the vehicle feature, controlling a setting of the vehicle feature based on the predefined device movement patterns at the wireless device.

12. The method of claim 11, wherein the vehicle feature includes a lighting system, the method further comprising controlling the setting associated with a light brightness of the lighting system based on the predefined device movement patterns including at least one of an up and down motion.

13. The method of claim 11, the vehicle feature being a climate system, the method further comprising controlling the setting associated with a temperature value of the climate system based on the predefined device movement patterns including at least one of an up and down motion.

14. The method of claim 11, further comprising, in response to the vehicle feature being a seat system, controlling the setting associated with a chair tilt position of the seat system based on the predefined device movement patterns including at least one of an up and down motion.

15. The method of claim 14, wherein the predefined device movement pattern is a side-to-side shaking motion for controlling the setting associated with a massage vibration function of the seat system.

16. The method of claim 14, wherein the predefined device movement pattern is a forward-to-back motion for controlling the setting associated with moving a seat position forward and back.

17. A method comprising:
    receiving, via a processor, a request to control a vehicle feature using a wireless device based on input received at a user interface associated with the vehicle feature;

searching for the wireless device based on the request to control the vehicle feature; and responsive to the wireless device determined to be within a predefined distance of the user interface, enabling the wireless device as a control for the vehicle feature using predefined device movement patterns performed with the wireless device by moving the wireless device in a given one of the predefined movement patterns, different ones of the movement patterns mapped to different controls of the feature.

* * * * *